(12) United States Patent
Wu

(10) Patent No.: US 12,494,306 B2
(45) Date of Patent: Dec. 9, 2025

(54) CABLE CONNECTING AND FIXING STRUCTURE AND METHOD FOR ARRANGING CABLE CONNECTING AND FIXING STRUCTURE

(71) Applicant: PEGATRON CORPORATION, Taipei (TW)

(72) Inventor: Shu-Wei Wu, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 176 days.

(21) Appl. No.: 18/498,934

(22) Filed: Oct. 31, 2023

(65) Prior Publication Data

US 2024/0266092 A1    Aug. 8, 2024

(30) Foreign Application Priority Data

Feb. 3, 2023   (TW) ................................ 112103923

(51) Int. Cl.
*H01B 17/00* (2006.01)
*H01B 17/26* (2006.01)

(52) U.S. Cl.
CPC ................................ *H01B 17/265* (2013.01)

(58) Field of Classification Search
CPC .................................................. H01B 17/265
See application file for complete search history.

(56) References Cited

U.S. PATENT DOCUMENTS

| | | | | |
|---|---|---|---|---|
| 5,144,777 A | * | 9/1992 | Fishel | E04F 19/08 |
| | | | | 52/220.8 |
| 5,207,602 A | * | 5/1993 | McMills | H01R 9/053 |
| | | | | 439/578 |
| 5,280,556 A | * | 1/1994 | Jones | G02B 6/4447 |
| | | | | 385/139 |

FOREIGN PATENT DOCUMENTS

| | | | | |
|---|---|---|---|---|
| CN | 215343030 U | | 12/2021 | |
| CN | 217509201 U | | 9/2022 | |
| EP | 2249070 A1 | * | 11/2010 | ............ F16L 5/10 |
| JP | 2009123573 A | | 6/2009 | |

* cited by examiner

*Primary Examiner* — Pete T Lee
(74) *Attorney, Agent, or Firm* — MUNCY, GEISSLER, OLDS & LOWE, P.C.

(57) ABSTRACT

The present invention provides a cable connecting and fixing structure and a method for arranging the cable connecting and fixing structure. The method for arranging the cable connecting and fixing structure includes the following steps: providing a cable body and a protective structure, the protective structure being provided with a clamping part; sleeving the cable body with the protective structure; enabling the cable body to pass through a fixed connection hole until an outer shell is clamped on the clamping part of the protective structure; and curing a bonding material to bond and strengthen the protective structure and the cable body, and the hardness of the cured bonding material being greater than the hardness of the protective structure.

8 Claims, 3 Drawing Sheets

CABLE CONNECTING AND FIXING STRUCTURE AND METHOD FOR ARRANGING CABLE CONNECTING AND FIXING STRUCTURE

BACKGROUND OF THE INVENTION

1. Field of the Invention

The present invention relates to a cable connecting and fixing structure and a method for arranging the cable connecting and fixing structure thereof, and particularly relates to a cable connecting and fixing structure which is assembled to a shell and then bonded, and a method for arranging the cable connecting and fixing structure.

2. Description of the Related Art

In terms of current technology, cable connection for electronic devices is already a common technology. There are tensile strength requirements for exposed cables assembled on shells of the electronic devices, so conventional methods of fixing cable connecting and fixing structures to the shells are generally to design a dispensing structure corresponding to the tensile direction to strengthen the rear ends of the cables on the shells of the electronic devices, thus resisting reverse pulling forces of the cables, or to design a multi-layer clamping structure to clamp the cable connecting and fixing structures.

FIG. 1A-1C is an assembly schematic diagram of a cable connecting and fixing structure in prior art.

Firstly, as shown in FIG. 1A, a cable connecting and fixing structure 90 includes a cable body 91 and a protective structure 92. The protective structure 92 is fixedly arranged on the outer side of the cable body 91. The outer side of the protective structure 92 may also be provided with a clamping part 93 so that an outer shell 80 may be clamped into the clamping part 93. Finally, the cable body 91, the protective structure 92 and the outer shell 80 are simultaneously bonded by a bonding material 94. Therefore, the mode of assembling the cable connecting and fixing structure 90 to the outer shell 80 in the prior art is relatively complex, and the outer shell 80 is also bonded, so it is needed to particularly consider the shape of the bonding part of the outer shell 80 and the cable connecting and fixing structure 90 because these factors may lead to the increase of the cost.

Therefore, it is necessary to invent a novel cable connecting and fixing structure and a method for arranging the cable connecting and fixing structure to solve the defects in the prior art.

SUMMARY OF THE INVENTION

A main objective of the present invention is to provide a cable connecting and fixing structure which is characterized by being assembled to a shell and then is bonded.

Another main objective of the present invention is to provide a method for arranging a cable connecting and fixing structure for the above cable connecting and fixing structure.

In order to achieve the above objectives, the cable connecting and fixing structure according to the present disclosure is fixedly connected to a fixed connection hole in an outer shell. The cable connecting and fixing structure includes a cable body, a protective structure and a bonding material. The protective structure is provided with a clamping part. The protective structure sleeves the cable body, and the cable body passes through the fixed connection hole until the outer shell is clamped and fixed into the clamping part of the protective structure. The bonding material is cured to bond and strengthen the protective structure and the cable body, and the hardness of the cured bonding material is greater than the hardness of the protective structure.

The method for arranging the cable connecting and fixing structure according to the present invention includes the following steps: providing a cable body and a protective structure, the protective structure being provided with a clamping part; sleeving the cable body with the protective structure; enabling the cable body to pass through a fixed connection hole until an outer shell is clamped and fixed into the clamping part of the protective structure; and curing the bonding material to bond and strengthen the protective structure and the cable body, the hardness of the cured bonding material being greater than the hardness of the protective structure.

DETAILED DESCRIPTION OF THE PREFERRED EMBODIMENTS

To make the review committee better understand the technical content of the present invention, a preferred specific embodiment is provided as follows.

Figure 1A:
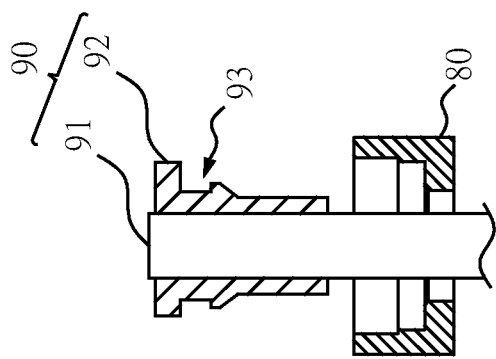
FIG. 1A-1C is an assembly schematic diagram of a cable connecting and fixing structure in the prior art.
Figure 1B:
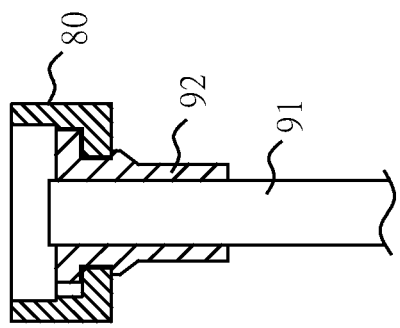
Figure 1C:
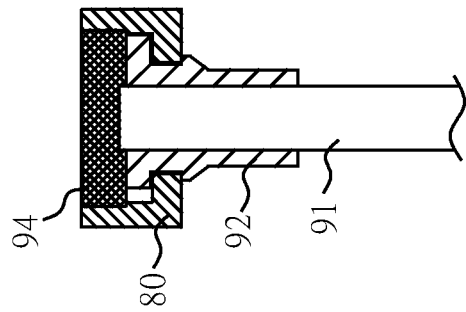
Figure 2A:
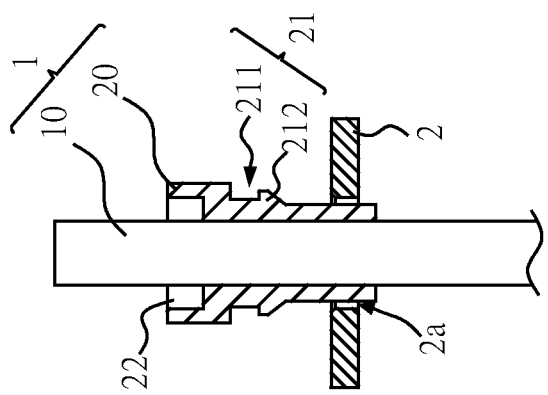
FIG. 2A-2C is an assembly schematic diagram of a cable connecting and fixing structure according to the present invention.
Figure 2B:
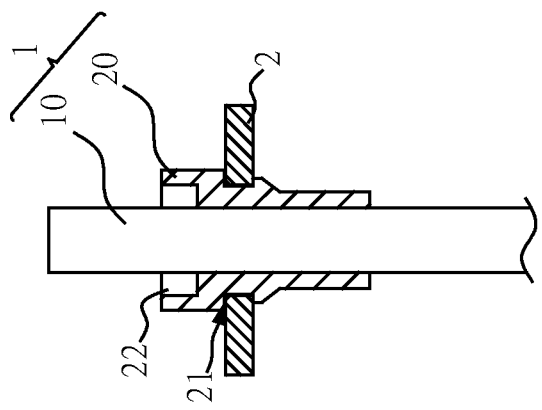
Figure 2C:
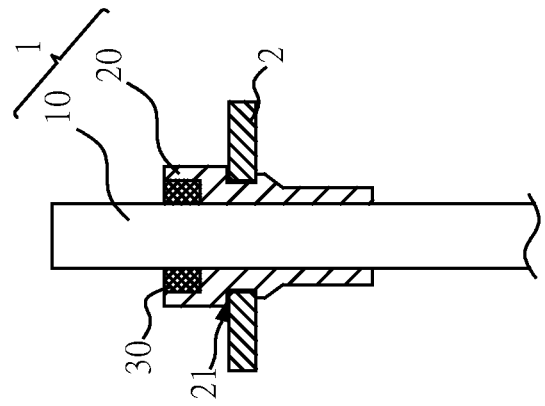

FIG. 2A-2C is an assembly schematic diagram of a cable connecting and fixing structure according to the present invention.

A cable connecting and fixing structure 1 according to the present invention includes a cable body 10, a protective structure 20 and a bonding material 30. The type of the cable body 10 is not limited in the present invention. The protective structure 20 may be made of a rubber material and sleeves an outer layer of the cable body 10, as shown in FIG. 2A. An outer shell 2 is provided with a fixed connection hole 2a; and with the cooperation of the aperture of the fixed connection hole 2a and the shape of the protective structure 20, the cable body 10 can pass through the fixed connection hole 2a until the outer shell 2 is clamped and fixed into a clamping part 21 of the protective structure 20. The middle of the clamping part 21 is provided with a recess 211, two sides of the recess 211 are provided with structures having height difference, and the side, with a lower structure, of the clamping part 21 is provided with an inclined plane 212. The outer shell 2 moves to the recess 211 of the clamping part 21 along the inclined plane 212, and the protective structure 20 is not prone to being disengaged from the outer shell 2 by means of the shape of the recess 211, as shown in FIG. 2B.

A groove 22 is formed in the contact surface of the protective structure 20 and the cable body 10. After the outer shell 2 is assembled on the protective structure 20, the groove 22 is filled with the bonding material 30, thus the protective structure 20 and the cable body 10 are bonded, and a hard tensile structure will be formed around the protective structure 20, as shown in FIG. 2C. The bonding material 30 may be a curing adhesive, such as epoxy resin, which is not limited in the present invention. The hardness of the cured bonding material 30 is greater than that of the protective structure 20. Therefore, after the protective structure 20 and the cable body 10 are fixedly bonded and strengthened, the cable connecting and fixing structure 1 can be prevented from being randomly separated from the outer shell 2.

Figure 3:
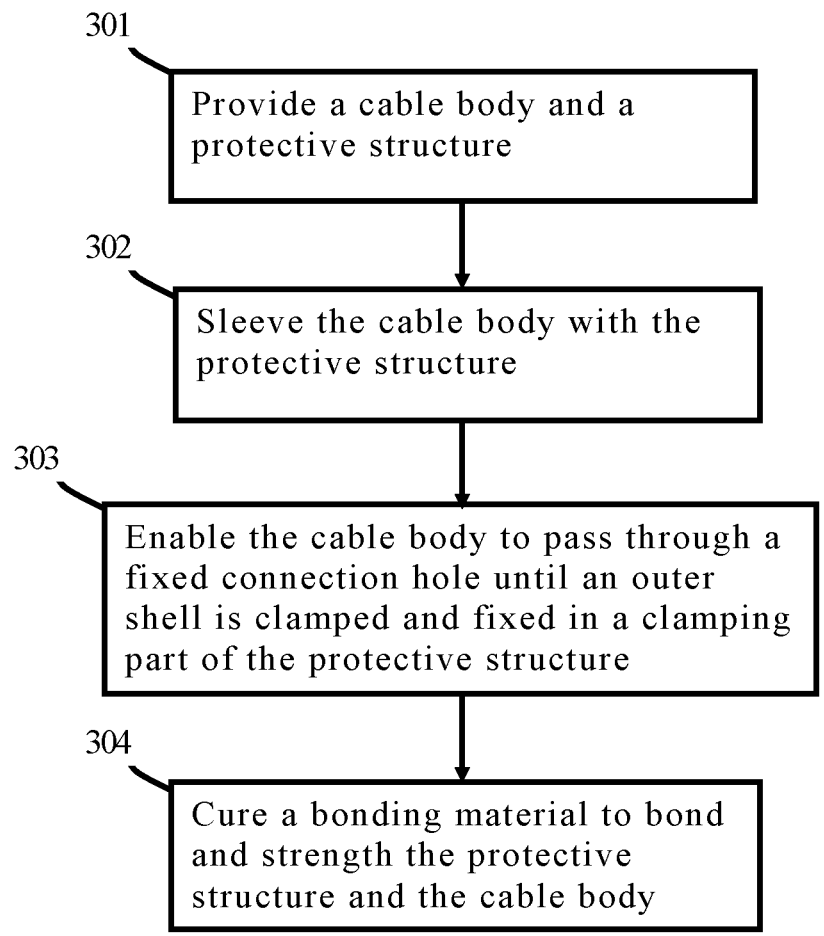
FIG. 3 is a step flowchart of a method for arranging a cable connecting and fixing structure according to the present invention.

FIG. 3 is a step flowchart of a method for arranging a cable connecting and fixing structure according to the present invention. It is to be noted that although the method for arranging the cable connecting and fixing structure according to the present invention is illustrated by the cable connecting and fixing structure 1, the method for arranging the cable connecting and fixing structure according to the present invention is not limited to the use of the cable connecting and fixing structure 1 with the same structure.

Firstly, step 301: provide the cable body and the protective structure.

The cable body 10 and the protective structure 20 are provided. The protective structure 20 may be made of rubber and is provided with the clamping part 21 and the groove 22.

Secondly, step 302: sleeve the cable body with the protective structure.

The protective structure 20 sleeves the outer side of the cable body 10.

Then, step 303: enable the cable body to pass through the fixed connection hole until the outer shell is clamped and fixed in the clamping part of the protective structure.

The cable body 10 passes through the fixed connection hole 2a, and the outer shell 2 moves to the recess 211 of the clamping part 21 along the inclined plane 212 outside the clamping part 21 so as to be clamped in the clamping part 21 of the protective structure 20.

Finally, step 304: cure the bonding material to bond and strength the protective structure and the cable body.

At the moment, after the outer shell 2 is clamped and fixed in the clamping part 21 of the protective structure 20, the groove 22 of the protective structure 20 is filled with the bonding material 30. After the bonding material 30 is cured, the cable body 10 and the protective structure 20 may be bonded and strengthened, then a hard tensile structure will be formed around the protective structure 20, and the hardness of the cured bonding material 30 is greater than that of the protective structure 20. Therefore, the outer shell 2 is not prone to being disengaged from the protective structure 20, and the purpose of fixing the cable connecting and fixing structure 1 is achieved.

It is to be noted that the method for arranging the cable connecting and fixing structure according to the present invention is not limited by the above step sequence, and the above step sequence may be changed as long as the purpose of the present invention can be achieved.

Therefore, the cable connecting and fixing structure 1 according to the present invention can be fixed to the outer shell 2, and is not prone to being disengaged due to pulling; and moreover, only a gap for the protective structure 20 to pass through needs to be reserved in the outer shell 2, additional structural design is not needed, and the defects in the prior art can be effectively overcome.

It is to be noted that the above implementations only illustrate the preferred embodiments of the present invention, and to avoid repetition, all possible combinations of changes have not been detailed. However, it is to be understood by those skilled in the art that all the above modules or components are not necessarily necessary. For the implementation of the present invention, other more detailed knowledge modules or components may also be included. Each module or component may be omitted or modified as needed, and there may not be any other modules or components between any two modules. As long as it does not deviate from the basic structure of the present invention, it shall be within the scope of the rights claimed in this patent, and the scope of the patent application shall prevail.

What is claimed is:

1. A method for arranging a cable connecting and fixing structure, fixedly connecting the cable connecting and fixing structure to a fixed connection hole in an outer shell, comprising:
   providing a cable body and a protective structure, the protective structure being provided with a clamping part;
   providing a groove in the protective structure, the groove being positioned in the contact surface of the protective structure and the cable body;
   sleeving the cable body with the protective structure;
   enabling the cable body to pass through the fixed connection hole until the outer shell is clamped and fixed into the clamping part of the protective structure;
   filling the groove with a bonding material; and
   curing the bonding material to bond and strengthen the protective structure and the cable body, the hardness of the cured bonding material being greater than the hardness of the protective structure.

2. The method for arranging the cable connecting and fixing structure according to claim 1, further comprising following steps:
   providing a curing adhesive as the bonding material.

3. The method for arranging the cable connecting and fixing structure according to claim 1, further comprising following steps:
   providing a rubber material as the protective structure.

4. The method for arranging the cable connecting and fixing structure according to claim 1, wherein the clamping part comprises a recess and an inclined plane; and the step of fixing and clamping the outer shell in the clamping part of the protective structure further comprises:
   moving the outer shell along the inclined plane to the recess of the clamping part so as to clamp and fix the outer shell by means of the shape of the recess.

5. A cable connecting and fixing structure, being fixedly connected to a fixed connection hole in an outer shell, comprising:
   a cable body;
   a protective structure which is provided with a clamping part and a groove, the protective structure sleeving the cable body, the cable body passing through the fixed connection hole until the outer shell is clamped and fixed in the clamping part of the protective structure; wherein the groove is positioned in the contact surface of the protective structure and the cable body; and
   a bonding material which is filled into the groove and cured to bond and strengthen the protective structure and the cable body, the hardness of the cured bonding material is greater than the protective structure.

6. The cable connecting and fixing structure according to claim 5, wherein the bonding material is a curing adhesive.

7. The cable connecting and fixing structure according to claim 5, wherein the protective structure is made of a rubber material.

8. The cable connecting and fixing structure according to claim 5, wherein the clamping part comprises a recess and an inclined plane; the outer shell moves along the inclined plane to the recess of the clamping part; and the outer shell is clamped and fixed by means of the shape of the recess.

\* \* \* \* \*